US012619385B1

(12) United States Patent
Singh et al.

(10) Patent No.: US 12,619,385 B1
(45) Date of Patent: May 5, 2026

(54) DATA RETRIEVAL

(71) Applicant: Sandisk Technologies, Inc., Milpitas, CA (US)

(72) Inventors: Ojasweeta Singh, Bangalore (IN); Ramanathan Muthiah, Bangalore (IN); Ramkumar Ramamurthy, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/938,491

(22) Filed: Nov. 6, 2024

(51) Int. Cl.
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
CPC ..... G06F 3/0659; G06F 3/0604; G06F 3/0679
USPC ........................................ 711/154
See application file for complete search history.

(56) References Cited

U.S. PATENT DOCUMENTS

| | | | |
|---|---|---|---|
| 9,727,503 B2 | 8/2017 | Kagan et al. | |
| 10,049,047 B1* | 8/2018 | Kotte .................. | G06F 12/0246 |
| 10,564,853 B2 | 2/2020 | Linkovsky et al. | |
| 2007/0061492 A1 | 3/2007 | Van Riel | |

| | | | |
|---|---|---|---|
| 2015/0363418 A1* | 12/2015 | Barajas Gonzalez ........................ G06F 16/1752 707/692 | |
| 2018/0081569 A1* | 3/2018 | Kan .................... | G06F 12/0246 |
| 2019/0227743 A1* | 7/2019 | Hamilton ................ | G06F 3/061 |
| 2022/0100407 A1* | 3/2022 | Secatch ................. | G06F 1/3275 |
| 2022/0398130 A1 | 12/2022 | Auernhammer et al. | |
| 2023/0011387 A1 | 1/2023 | Qiu et al. | |

OTHER PUBLICATIONS

"Microsoft Windows zero page"; Google search of "Microsoft Windows zero page"; downloaded from the Internet at *Microsoft Windows zero page—Google Search* on Nov. 5, 2024; Nov. 5, 2024; 2 pages.
"NVM Express, Revision 1.1a"; downloaded from the Internet on Nov. 5, 2024 at *Non-Volatile Memory Host Controller Interface*; Intel Corporation; Sep. 23, 2013; 166 pages.

* cited by examiner

*Primary Examiner* — Gautam Sain
(74) *Attorney, Agent, or Firm* — Crowell & Moring LLP

(57) ABSTRACT

A data storage device usually performs better when executing a sequential read command than when executing a plurality of random read commands. If the amount of data requested to be read by a plurality of random read commands in an address range is greater than a certain percentage of the address range, it may be more efficient to treat the plurality of random read commands as a sequential read command for the entire address range. After reading the entire address range, the data storage device can determine which portions of the read data should be returned in response to the plurality of random read commands.

20 Claims, 11 Drawing Sheets

DATA RETRIEVAL

BACKGROUND

Various storage input-output (IO) requests from various applications in a host can be handled by a storage driver in the host, which in turn interfaces with a data storage device to write or read data. When applications run in the host, the order of the IO requests that are queued can be completely random, which can cause a mixed workload in the data storage device. The data storage device can perform well (e.g., with a relatively-high megabits per second (MBPS) throughput) when the retrieval requests are sequential in nature. This is due to less overhead in resolving the logical-to-physical (L2P) address translations associated with the data, as well as fewer memory (e.g., NAND) senses for the same amount of data retrieval requests. When the data storage device processes random data, the overheads are typically more.

DETAILED DESCRIPTION

Figures 1A, 1B, 1C:
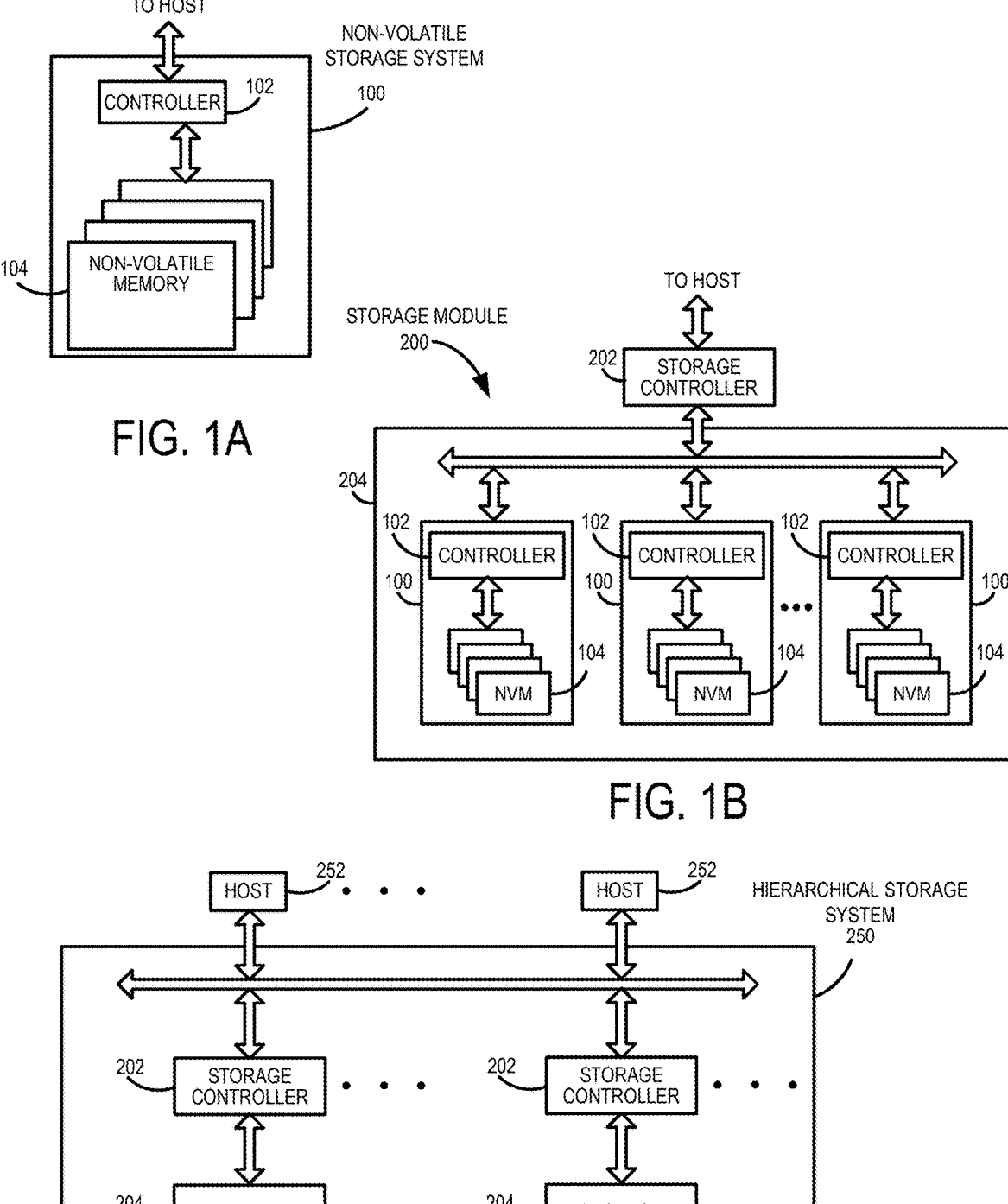
FIG. 1A is a block diagram of a data storage device of an embodiment.
FIG. 1B is a block diagram illustrating a storage module of an embodiment.
FIG. 1C is a block diagram illustrating a hierarchical storage system of an embodiment.

The following embodiments generally relate to a data storage device and method for value-proposition-based data retrieval. In one embodiment, a data storage device is provided comprising a memory and one or more processors. The one or more processors, individually or in combination, are configured to: receive a plurality of commands to read data stored non-sequentially in an address range of the memory; determine whether a total size of the data requested to be read by the plurality of commands is greater than a threshold percentage of a total size of the address range; and in response to determining that the total size of the data requested to be read by the plurality of commands is greater than the threshold percentage of the total size of the address range: read data stored in an entirety of the address range, wherein the data stored in the entirety of the address range comprises data requested to be read by the plurality of commands and data not requested to be read by the plurality of commands; and respond to the plurality of commands by returning only the data requested to be read by the plurality of commands.

In another embodiment, a method is provided that is performed in a data storage device comprising a memory. The method comprises: receiving a plurality of read commands that fall in one region in the memory; determining a sum of sizes of data requested to be read by the plurality of read commands; determining a ratio of (a) the sum of the sizes of data requested to be read by the plurality of read commands and (b) a total size of the region in the memory; determining whether the ratio is greater than a threshold percentage of the total size of the region in the memory; and in response to determining that the ratio is greater than the threshold percentage of the total size of the region in the memory: executing the plurality of read commands as a sequential read command for the size of the region; and for each portion of data read by executing the plurality of read commands: determining whether the portion of the data was requested by the plurality of read commands; in response determining that the portion of the data was requested by the plurality of read commands, keeping the data; in response determining that the portion of the data was not requested by the plurality of read commands, discarding the data.

In yet another embodiment, a data storage device is provided comprising: a memory; and means for executing a plurality of read commands for random data stored in an address range in memory as a sequential read command for an entirety of the address range in response to a total size of the random data requested to be read by the plurality of read commands being greater than a threshold percentage of a size of the entirety of the address range.

Other embodiments are possible, and each of the embodiments can be used alone or together in combination. Accordingly, various embodiments will now be described with reference to the attached drawings.

EMBODIMENTS

The following embodiments relate to a data storage device (DSD). As used herein, a "data storage device" refers to a non-volatile device that stores data. Examples of DSDs include, but are not limited to, hard disk drives (HDDs), solid state drives (SSDs), tape drives, hybrid drives, etc. Details of example DSDs are provided below.

Examples of data storage devices suitable for use in implementing aspects of these embodiments are shown in FIGS. 1A-1C. It should be noted that these are merely examples and that other implementations can be used. FIG. 1A is a block diagram illustrating the data storage device 100 according to an embodiment. Referring to FIG. 1A, the data storage device 100 in this example includes a controller 102 coupled with a non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. The controller 102 interfaces with a host system and transmits command sequences for read, program, and erase operations to non-volatile memory die 104. Also, as used herein, the phrase "in communication with" or "coupled with" could mean directly in communication/coupled with or indirectly in communication/coupled with through one or more components, which may or may not be shown or described herein. The communication/coupling can be wired or wireless.

Figure 2A:
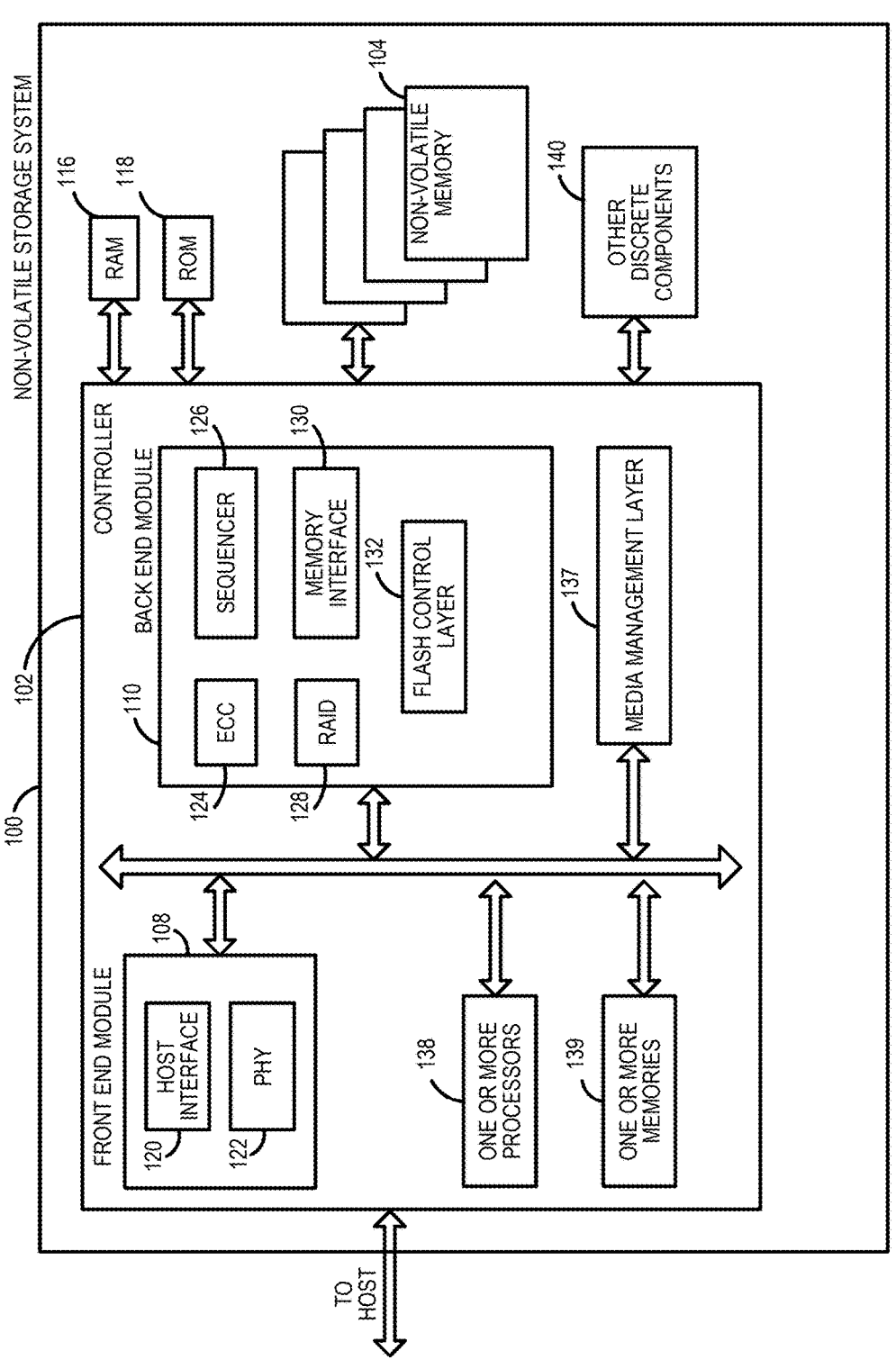
FIG. 2A is a block diagram illustrating components of the controller of the data storage device illustrated in FIG. 1A according to an embodiment.

The controller 102 (which may be a non-volatile memory controller (e.g., a flash, resistive random-access memory (ReRAM), phase-change memory (PCM), or magnetoresistive random-access memory (MRAM) controller)) can include one or more components, individually or in combination, configured to perform certain functions, including, but not limited to, the functions described herein and illustrated in the flow charts. For example, as shown in FIG. 2A, the controller 102 can comprise one or more processors 138 that are, individually or in combination, configured to perform functions, such as, but not limited to the functions described herein and illustrated in the flow charts, by executing computer-readable program code stored in one or more non-transitory memories 139 inside the controller 102 and/ or outside the controller 102 (e.g., in random access memory (RAM) 116 or read-only memory (ROM) 118). As another example, the one or more components can include circuitry, such as, but not limited to, logic gates, switches, an application specific integrated circuit (ASIC), a programmable logic controller, and an embedded microcontroller.

In one example embodiment, the non-volatile memory controller 102 is a device that manages data stored on non-volatile memory and communicates with a host, such as a computer or electronic device, with any suitable operating system. The non-volatile memory controller 102 can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware (and/or other metadata used for housekeeping and tracking) to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card-based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, double-data-rate (DDR) interface, or serial attached small scale compute interface (SAS/SCSI). Storage module 200, in one embodiment, may be a solid-state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCOE) interface. In one embodiment, the system illustrated in FIG. 1C may be a rack mountable mass storage system that is accessible by multiple host computers, such as would be found in a data center or other location where mass storage is needed.

Referring again to FIG. 2A, the controller 102 in this example also includes a front-end module 108 that interfaces with a host, a back-end module 110 that interfaces with the one or more non-volatile memory die 104, and various other components or modules, such as, but not limited to, a buffer manager/bus controller module that manage buffers in RAM 116 and controls the internal bus arbitration of controller 102. A module can include one or more processors or components, as discussed above. The ROM 118 can store system boot code. Although illustrated in FIG. 2A as located separately from the controller 102, in other embodiments one or both of the RAM 116 and ROM 118 may be located within the controller 102. In yet other embodiments, portions of RAM 116 and ROM 118 may be located both within the controller 102 and outside the controller 102.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. The controller 102 in this example also comprises a media management layer 137 and a flash control layer 132, which controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller are optional components that are not necessary in the controller 102.

Figure 2B:
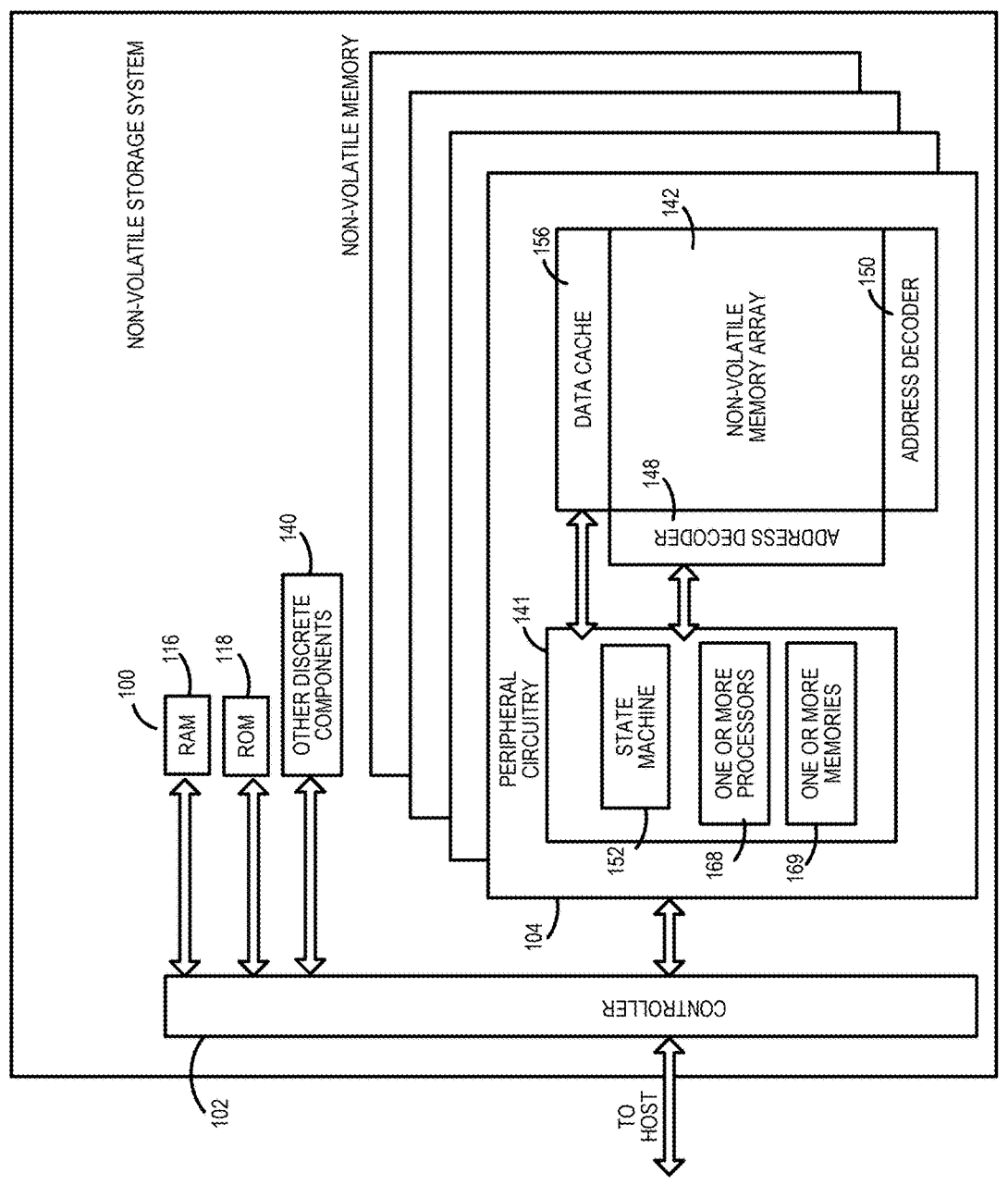
FIG. 2B is a block diagram illustrating components of the data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data and address decoders 148, 150. The peripheral circuitry 141 in this example includes a state machine 152 that provides status information to the controller 102. The peripheral circuitry 141 can also comprise one or more components that are, individually or in combination, configured to perform certain functions, including, but not limited to, the functions described herein and illustrated in the flow charts. For example, as shown in FIG. 2B, the memory die 104 can comprise one or more processors 168 that are, individually or in combination, configured to execute computer-readable program code stored in one or more non-transitory memories 169, stored in the memory array 142, or stored outside the memory die 104. As another example, the one or more components can include circuitry, such as, but not limited to, logic gates, switches, an application specific integrated circuit (ASIC), a programmable logic controller, and an embedded microcontroller.

In addition to or instead of the one or more processors 138 (or, more generally, components) in the controller 102 and the one or more processors 168 (or, more generally, components) in the memory die 104, the data storage device 100 can comprise another set of one or more processors (or, more generally, components). In general, wherever they are located and however many there are, one or more processors (or, more generally, components) in the data storage device 100 can be, individually or in combination, configured to perform various functions, including, but not limited to, the functions described herein and illustrated in the flow charts. For example, the one or more processors (or components) can be in the controller 102, memory device 104, and/or other location in the data storage device 100. Also, different functions can be performed using different processors (or components) or combinations of processors (or components). Further, means for performing a function can be implemented with a controller comprising one or more components (e.g., processors or the other components described above).

Returning again to FIG. 2A, the flash control layer 132 (which will be referred to herein as the flash translation layer (FTL) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
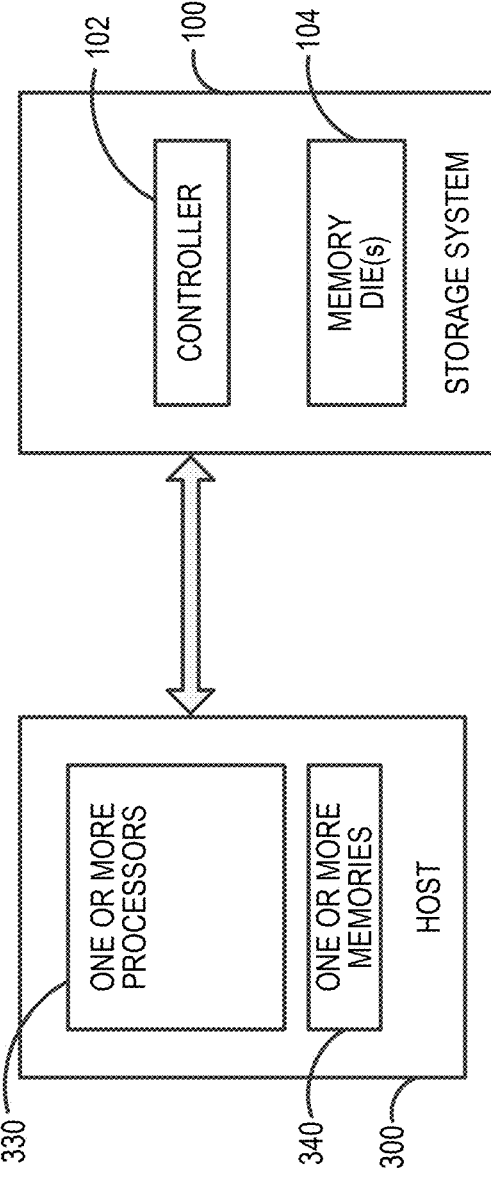
FIG. 3 is a block diagram of a host and a data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises one or more processors 330 and one or more memories 340. In one embodiment, computer-readable program code stored in the one or more memories 340 configures the one or more processors 330 to perform the acts described herein as being performed by the host 300. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

As mentioned above, various storage input-output (IO) requests from various applications in the host 300 can be handled by a storage driver in the host 300, which in turn interfaces with the data storage device 100 to write or read data. When applications run in the host 300, the order of the IO requests that are queued can be completely random, which can cause a mixed workload in the data storage device 100. The data storage device 100 can perform well (e.g., with a relatively-high megabits per second (MBPS) throughput) when the retrieval requests are sequential in nature. This is due to less overhead in resolving the logical-to-physical (L2P) address translations associated with the data, as well as fewer memory (e.g., NAND) senses for the same amount of data retrieval requests. When the data storage device 100 processes random data (e.g., data less than 64 KB (such as 4 KB or 8 KB)), the overheads are typically more.

The following embodiments provide methods to minimize latency associated with data retrieval by leveraging fundamental principles of the storage architecture. In one embodiment, methods are performed in a driver in the host 300 or in a flash translation layer (FTL) module in the controller 102 of the data storage device 100. In one example implementation, these methods are used in an environment where the data storage device 100 is a compute-storage device that has compute cores accessing the FTL module for IO requirements (e.g., for logical-to-physical address translation).

Figure 4:
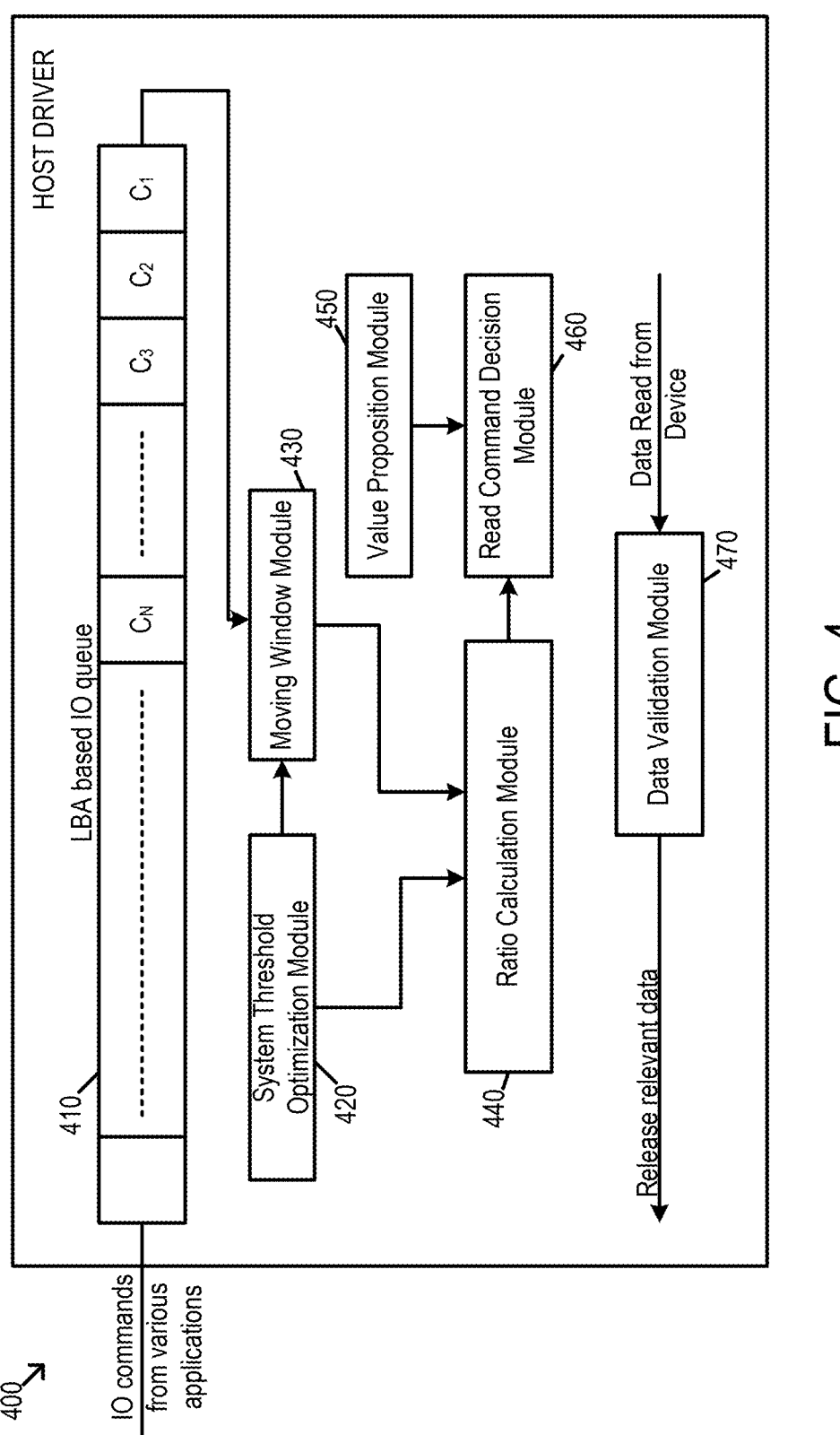
FIG. 4 is an illustration of a host driver of an embodiment.

Turning again to the drawings, FIG. 4 is an illustration of a host driver 400 of an embodiment. The host driver 400 can be implemented, for example, by the one or more processors 330 in the host 300 executing computer-readable program code stored in the one or more memories 340 in the host 300. As shown in FIG. 4, the host driver 400 in this example comprises a logical block address (LBA) IO queue 410, a system threshold module 420, a moving window module 430, a ratio calculation module 440, a value proposition module 450, a read command decision module 460, and a data validation module 470.

In general, the host driver 400 (which is sometimes referred to as the storage driver module) receives IO commands from various applications in the host 300 and stores them in the LBA-based IO queue 410, which keeps a record of incoming IO commands. The LBA-based IO queue 410 can calculate the start LBA of one chunk and the end LBA for another chunk with the help of a moving window provided by the moving window module 430. The moving window can cover of all the read commands that fall in one moving window range. The moving window range can be defined by a threshold value for chunk size (i.e., totalChunkSize). For example, if the start LBA of one chunk is 64 KB and the end LBA of another chunk is 356 KB, then the size of the range is (356 KB-64 KB). The host driver 400 can have a default system threshold for the chunk size (totalChunkSize) for which the host 300 can send sequential read commands. This threshold can be modified by the system threshold optimization module 420 based on the latency of the completed IOs. To summarize, the host 300 may not know the correct/perfect chunk size, but the host 300 can optimize its logic over time based on the latencies associated with completed IO.

As mentioned above, the moving window module 420 can dynamically select a set of the IO commands that are in the moving window at a given time. In this way, the set of all logical addresses and sizes associated with various "chunks" of data in a given window can be tracked. For the commands in the moving window at a given time, the ratio calculation module 440 can calculate the ratio of the sum of the amount of data chunks that needs to be fetched in a logical range to the size of the logical range. Once the start and end LBAs of the chunks that belong to same logical range are calculated, the ratio calculation module 440 can calculate the ratio between the sum of size of individual chunks and the size of full chunk, as represented by the following equation:

$$ratio = \frac{\text{sum of size of individual chunks}(totalRdSize)}{\substack{\text{size of full range that includes} \\ \text{all the portions of the chunk}(totalChunkSize)}}$$

If the ratio is more than a system threshold established by the system threshold optimization module 420, the read command decision module 460 can fetch the entire size of the logical range of data from the data storage device 100. The data validation module 470 receives the data read from the data storage device 100, retains the necessary chunks of the data, and discards the unnecessary chunks of the data, rather than fetching multiple random chunks in that range. Additionally, the host driver 400 can fetch extra data only when it determines that it has sufficient cache to fetch the entire range to minimize the system latency. Thus, the decision can be based not only on a calculated moving average ratio but also on cache overhead and availability at the host side to perform this action. In some cases, the decision to take the approach can be based on host turnaround time associated with the command.

Figure 6B:
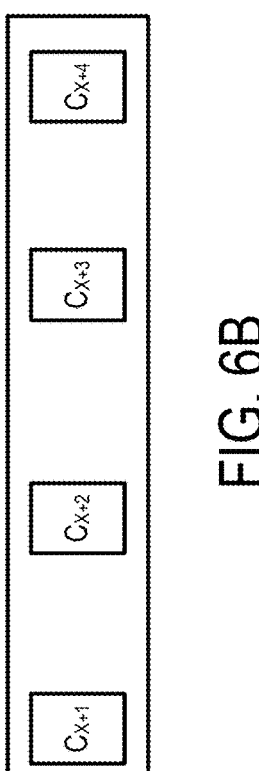
FIGS. 6A and 6B are illustrations of a moving window of an embodiment.
Figure 6A:
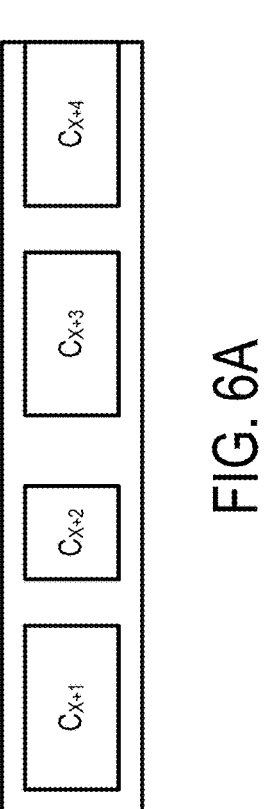

Turning again to the drawings, FIGS. 6A and 6B are illustrations of a moving window that will be used to illustrate an example of this embodiment. In this example, the moving window is used to find the relevant read commands belonging to a particular chunk and to calculate totalRdSize. The system threshold optimizer module 430 can modify the totalChunkSize threshold value based on completed IO commands latency. The ratio calculation module 440 can find the ratio between totalRdSize and toatlChunkSize, from which a decision can be made as to whether to send a single sequential read command or multiple read commands. That is, based on the calculated ratio, the host driver 400 can decide to either send a sequential read command for the entire logical region and discard the unwanted chunks or send read command for individual chunks. If a new chunk suddenly gets added in a logical range, the moving window can take care of the incoming chunk, and, correspondingly, the calculated ratio can be modified. In this way, the change in decision to use a sequential read command can happen.

In the example in FIGS. 6A and 6B, the threshold for chunk size is 128 KB, and the command $C_{x+1}$, $C_{x+2}$, $C_{x+3}$, $C_{x+4}$ are stored in the IO queue 410. In FIG. 6A, the moving window identifies that all the read command belongs to same logical region. The sum of the size of the individual chunks (totalRdSize) is 110 KB, and the ratio is 110/128, which is >X % totalChunkSize. So, the host driver 400 will make the decision to send a single sequential read command to read the entire chunk and then discard the not required data. In FIG. 6B, the moving window identifies that all the read command belongs to same logical region. The sum of size of individual chunks (totalRdSize) is 16 KB, and the ratio is 16/128, which is <X % totalChunkSize. Here, the host driver 400 will make the decision to send separate commands for each read.

Figure 7:
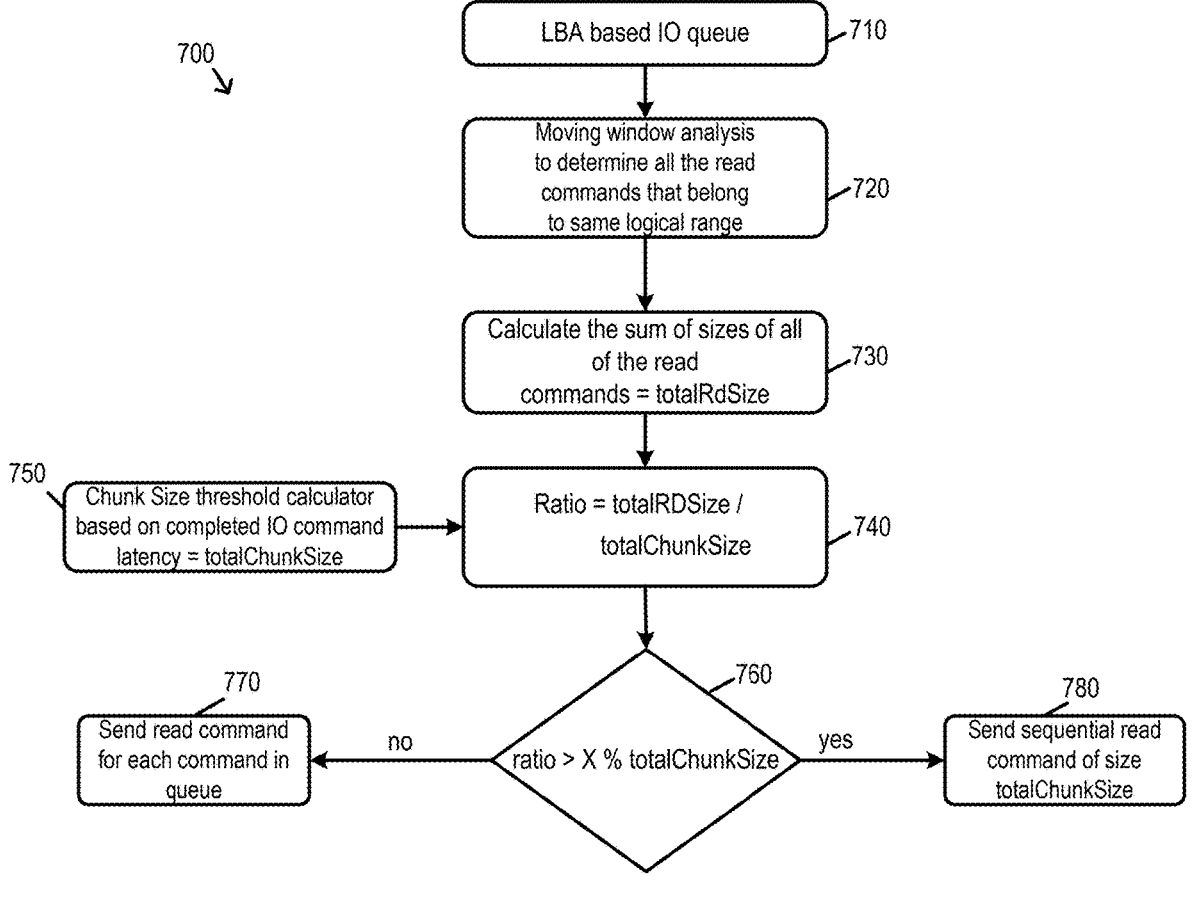
FIGS. 7 and 8 are flowcharts of methods performed by a host driver of an embodiment.
Figure 8:
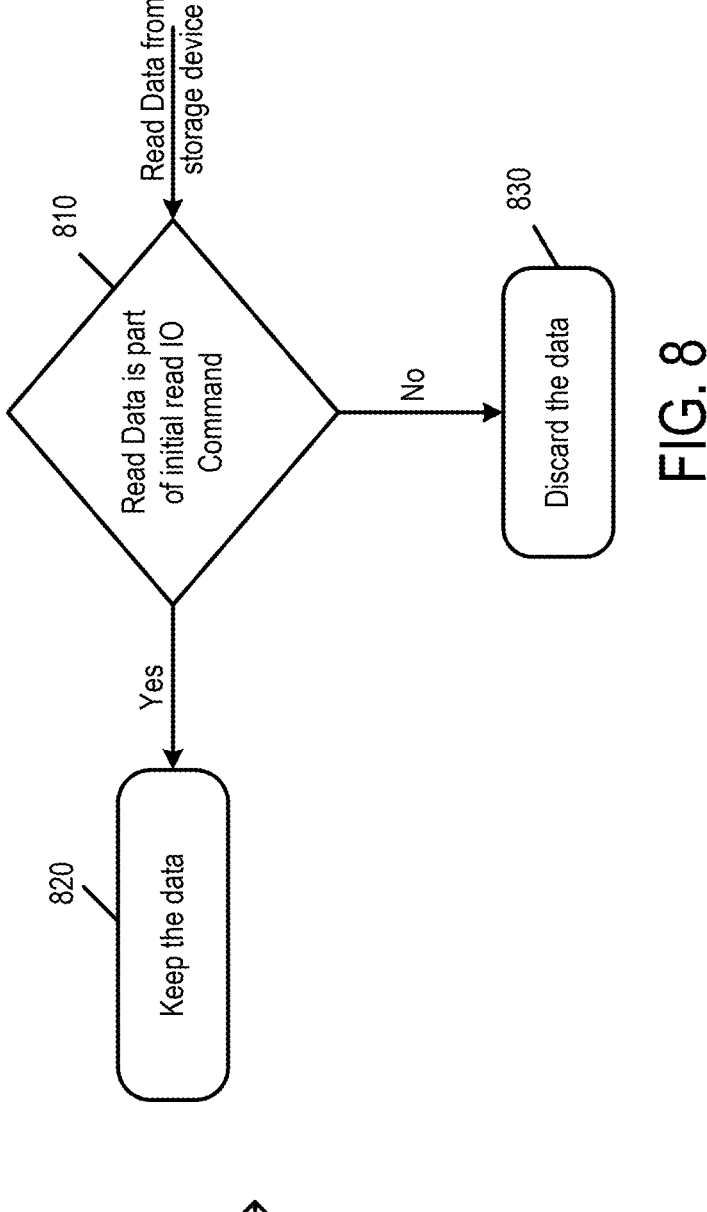

FIGS. 7 and 8 are flow charts 700, 800 that illustrate the methods described above. As shown in FIG. 7, IO commands from various applications in the host 300 are stored in the LBA-based IO queue 410 (710). Then, moving window analysis is performed to determine all the read commands that belong to the same logical range (720). Next, the total read size is calculated by calculating the sum of the size of all the read commands (730), and then a ratio is calculated of the total read size to the total chunk size (740), which is provided by a chuck size threshold calculator based on completed IO latency (750). Then, a decision is made as to whether the ratio is greater than a percentage of the total chuck size (760). If it isn't, the host 300 sends a read command for each command in the queue (770). If it is, the host 300 sends a sequential read command for the total chuck size (780), and the flow chart 800 in FIG. 8 is invoked. As shown in FIG. 8, when all of the data is returned to the host 500, the host 500 determines, for each chuck of data, whether the chuck is part of the initial read IO command (810). If it is, that chuck of data is kept (820); otherwise, it is discarded (830).

One advantage associated with this method is that the data retrieval request from the host driver 400 can be made sequential for some cases where the loss due to the data discard is less. This reduces memory read-and-response latency in the data storage device 100 as compared to issuing multiple random read commands in that range, which can impact the overall quality of service (QoS) of the system. At the same time, by having a system threshold to check if the necessary data is sufficiently high in a range (as defined by the ratio), the value proposition module 450 can find a sweet spot that can be obtained between the two scenarios with minimal possible latency to retrieve data from the data storage device 100.

Figure 5:
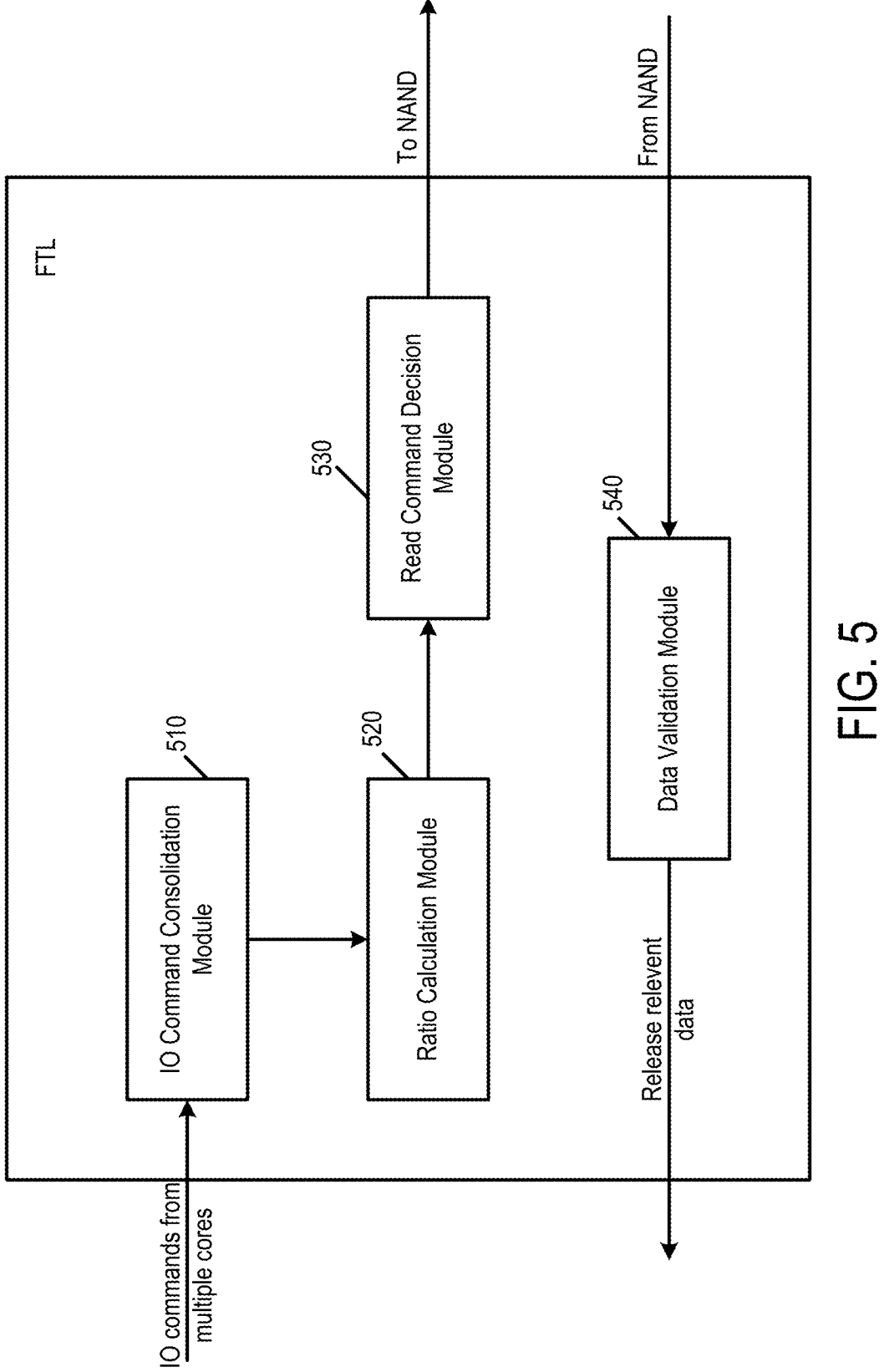
FIG. 5 is an illustration of a controller of an embodiment.

In another embodiment, instead of or in addition to using the host driver 400, the controller 102 in the data storage device 100 is used to provide value-proposition-based data retrieval. FIG. 5 is an illustration of example FTL components/functionality in the controller 102 that can be used in this embodiment. The FTL components can be implemented, for example, by the one or more processors in the controller 102 executing computer-readable program code stored in the one or more memories in the controller 102 or elsewhere in the data storage device 100. As shown in FIG. 5, the FTL components in this example comprise an IO command consolidation module 510, a ratio calculation module 520, a read command decision module 530, and a data validation module 540.

In one example implementation, the data storage device 100 is a compute-storage system with accelerator cores, and the IO command consolidation module 510 is configured to consolidate the set of all IO requests from multiple in-house accelerator cores in the data storage device 100. The ratio calculation module 520 is configured to calculate the ratio of the sum of the requested set of chunks from one or many cores to the size of the associated region. The read command decision module 530 is configured to determine if the controller 102 should process the read commands as one request or multiple requests in the data path. Using one request, the controller 102 would fetching all of the data in the range from the memory 104, and the data validation module 540 would discard the unnecessary data prior to passing the data to the compute cores. Using multiple requests, the controller 102 would process each read request as multiple chunks.

In some cases, the controller 102 can perform the action of complete-range-fetch-and-discard when it determines that it has sufficient cache to fetch the entire data range. Apart from just the available cache in the FTL, the action of complete-range-fetch-and-discard can also be based on other system workload metrics, such as, but not limited to, flash interface module (FIM)/flash channel workload and/or the decode workload of an error correction module (e.g., a low-density parity check (LDPC) engine). For example, if the bit error rate (BER) of the retrieved data is above a threshold, fetching more data than required can backfire and lead to more LDPC decode latency. As such, device- and memory-specific parameters can be considered when arriving upon a decision on an optimal retrieval mechanism.

Figure 9:
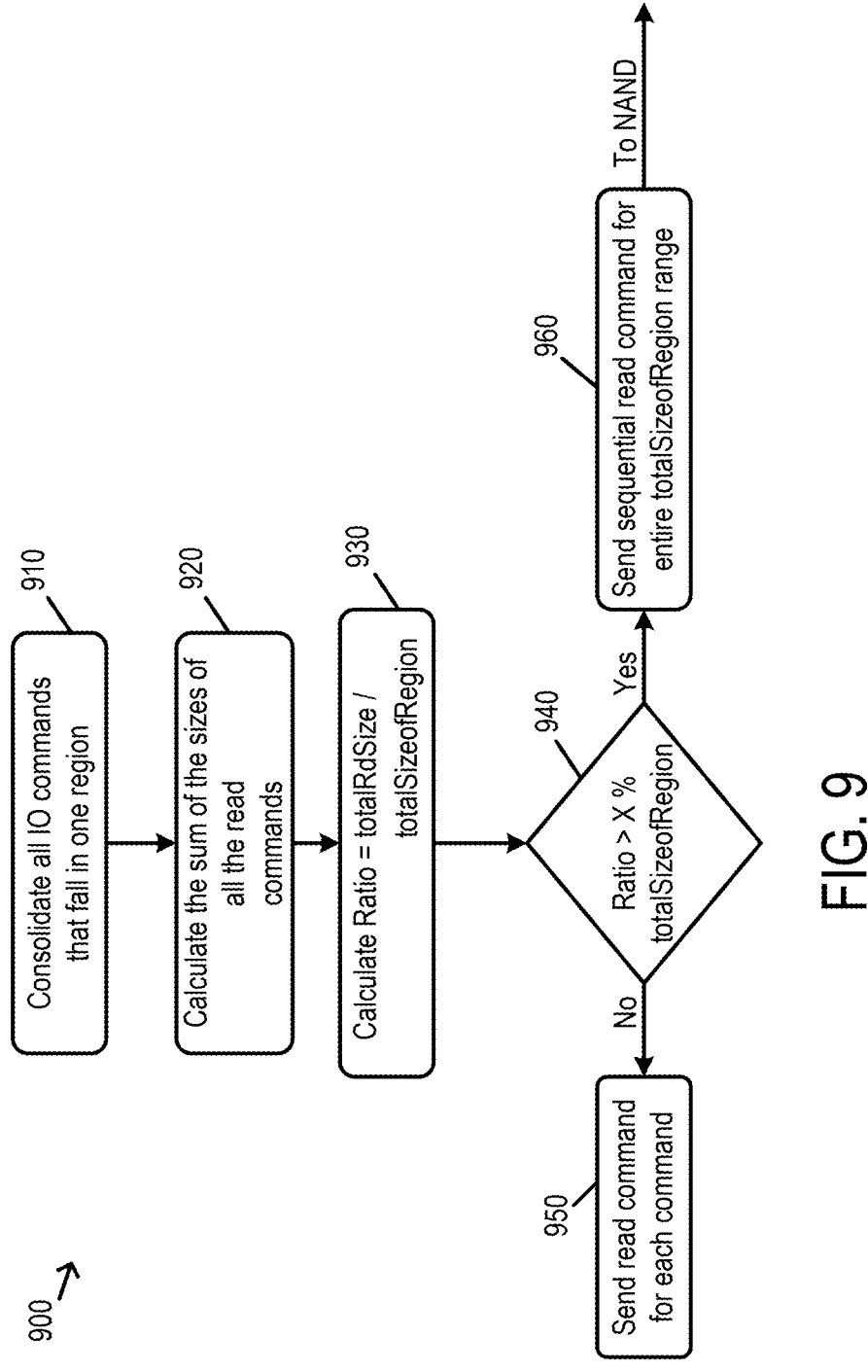
FIGS. 9 and 10 are flowcharts of methods performed by a data storage device of an embodiment.
Figure 10:
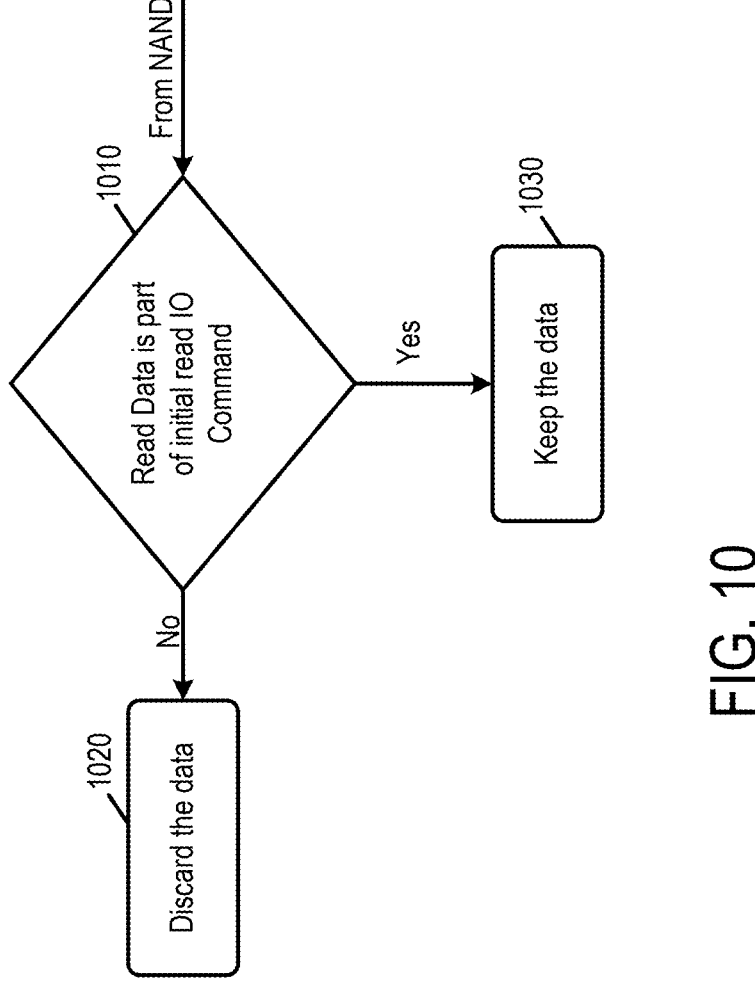

FIGS. 9 and 10 are flow charts 900, 1000 that illustrate the methods described above. As shown in FIG. 9, the controller 102 of the data storage device 100 consolidates all IO commands (e.g., from various applications in the host 300 and/or from multiple cores in the data storage device 100) that fall in one region (910). The controller 102 then calculates the sum of the size of all the read commands in that region (920) and also calculates a ratio of the total read size to the total size of the region (930). Next, the controller 102 determines whether the ratio is greater than a percentage of the total size of the region (940). If the ratio is not greater than the percentage of the total size of the region, the controller 102 executes individual read commands (950). If the ratio is greater than the percentage of the total size of the region, the controller 102 executes a sequential read command for the total size of the region (960), and the flow chart 1000 in FIG. 10 is invoked. As shown in FIG. 10, when the all of the data is read from the memory 104, the controller 102 determines, for each chuck of data, whether the chuck is part of the initial read IO command (1010). If it isn't, the data discarded (1020); otherwise the data is kept (1030) and can be returned to its requestor.

The following are example use cases of embodiments that make an IO request knowing that some of the retrieved data will be discarded in the storage backend for the purposes of QoS optimization. It should be understood that these are merely examples and that other examples can be used. One example use case relates to fetching metadata from data, retrieving data for inference (by the host 300 or by the data storage device 100), and parsing a lot of random data that is closely-associated logically. In this use case, the host driver 400 can have a moving window when new requests are to be processed that fall in a range. In some cases, the host driver 400 can positively bias certain regions that are densely arranged for IO services.

Consider, for example, the situation in which the host 300 or data storage device 100 is interested in fetching four chunks of 28 KB of data, each of them having logical addresses that are 4 KB apart (e.g., the pattern of: 28 KB data, 4 KB not required, 28 KB data, 4 KB not required, 28 KB data, 4 KB not required, 28 KB data). Assuming a NAND sense time of 90 us, the transfer time would be one millisecond (ms) for 100 KB of data (assuming 100 MBPS host speed as well as flash channel transfer speed). Thus, the command overhead including turnaround time would be five microseconds (us) per command. Using the embodiments described above, reading the entire stretch of addresses as a 124 KB chunk would have a latency of 1.24 ms+90 us+5 us=1.335 ms. In contrast, latency of reading each 28 KB chuck individually would be: (0.28 ms+90 us+5 us)*4=0.375 ms*4=1.5 ms (where NAND sense would be separate). Thus, these embodiments can be used to improve performance for random read commands without affecting the interface between host 300 and the data storage device 100.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/ or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a RcRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:

a memory; and one or more processors, individually or in combination, configured to;

receive, from a requestor, a plurality of commands to read data stored non-sequentially in an address range of the memory;

determine a total size of the data requested to be read by the plurality of commands;

determine a ratio of (a) the total size of the data requested to be read by the plurality of commands and (b) a total size of the address range:

determine whether the ratio is greater than a threshold percentage of a total size of the address range; and in response to determining that the ratio is greater than the threshold percentage of the total size of the address range:

read data stored in an entirety of the address range, wherein the data stored in the entirety of the address range comprises data requested to be read by the plurality of commands and data not requested to be read by the plurality of commands; and respond to the plurality of commands by, for each portion of the data that is read:

determining whether the portion was requested by the plurality of commands; and in response to determining that the portion was requested by the plurality of commands, returning that portion to the requestor;

wherein only the portions of data requested to be read by the plurality of commands are returned to the requestor.

2. The data storage device of claim 1, wherein the one or more processors, individually or in combination, are further configured to:

in response to determining that the ratio is not greater than the threshold percentage of the total size of the address range, execute each of the plurality of commands as individual commands.

3. The data storage device of claim 1, wherein the requestor comprises a plurality of cores in the data storage device.

4. The data storage device of claim 1, wherein the requestor comprises a host in communication with the data storage device.

5. The data storage device of claim 1, wherein the data stored in the entirety of the address range is read also in response to determining that there is enough cache memory available to store that data.

6. The data storage device of claim 1, wherein the data stored in the entirety of the address range is read also in response to determining that a flash channel workload is below a workload threshold.

7. The data storage device of claim 1, wherein the data stored in the entirety of the address range is read also in response to determining that a decode workload is below a decode threshold.

8. The data storage device of claim 1, wherein the data stored in the entirety of the address range is read also in response to determining that a data-storage-device-specific parameter and/or a memory-specific parameter is satisfied.

9. The data storage device of claim 1, wherein the plurality of commands is consolidated from a larger set of commands, at least some of which do not belong to the address range.

10. The data storage device of claim 1, wherein the data storage device comprises a compute storage system with a plurality of accelerator cores.

11. The data storage device of claim 1, wherein the memory comprises a three-dimensional memory.

12. A method comprising:

performing in a data storage device comprising a memory:

receiving a plurality of read commands that fall in one region in the memory;

determining a sum of sizes of data requested to be read by the plurality of read commands;

14 determining a ratio of (a) the sum of the sizes of data requested to be read by the plurality of read commands and (b) a total size of the region in the memory;

determining whether the ratio is greater than a threshold percentage of the total size of the region in the memory; and in response to determining that the ratio is greater than the threshold percentage of the total size of the region in the memory:

executing the plurality of read commands as a sequential read command for the size of the region; and for each portion of data read by executing the plurality of read commands:

determining whether the portion of the data was requested by the plurality of read commands;

in response to determining that the portion of the data was requested by the plurality of read commands, keeping the data;

in response to determining that the portion of the data was not requested by the plurality of read commands, discarding the data.

13. The method of claim 12, further comprising:

in response to determining that the ratio is not greater than the threshold percentage of the total size of the region in the memory, executing the plurality of read commands as individual commands.

14. The method of claim 12, wherein the method is performed by a controller comprising:

an input-output command consolidation module;

a ratio calculation module;

a read command decision module; and a data validation module.

15. The method of claim 12, wherein the plurality of read commands is received from a plurality of cores in the data storage device.

16. The method of claim 12, wherein the plurality of read commands is received from a host in communication with the data storage device.

17. The method of claim 12, wherein the plurality of read commands is executed as a sequential read command also in response to determining that more than a threshold amount of cache memory is available.

18. The method of claim 12, wherein the plurality of read commands is executed as a sequential read command also in response to determining that a flash channel workload is below a workload threshold.

19. The method of claim 12, wherein the plurality of read commands is executed as a sequential read command also in response to determining that a decode workload is below a decode threshold.

20. A data storage device comprising:

a memory; and means for;

receiving a plurality of read commands that fall in one region in the memory;

determining a sum of sizes of data requested to be read by the plurality of read commands;

determining a ratio of (a) the sum of the sizes of data requested to be read by the plurality of read commands and (b) a total size of the region in the memory;

determining whether the ratio is greater than a threshold percentage of the total size of the region in the memory; and in response to determining that the ratio is greater than
the threshold percentage of the total size of the
region in the memory:
executing the plurality of read commands as a
sequential read command for the size of the  5
region; and
for each portion of data read by executing the
plurality of read commands:
determining whether the portion of the data was
requested by the plurality of read commands;  10
in response to determining that the portion of the
data was requested by the plurality of read
commands, keeping the data;
in response to determining that the portion of the
data was not requested by the plurality of read  15
commands, discarding the data.

* * * * *